United States Patent
Madison, II et al.

(10) Patent No.: US 8,463,691 B2
(45) Date of Patent: *Jun. 11, 2013

(54) STUDENT VENTURE MANAGEMENT

(76) Inventors: Michael K. Madison, II, San Jose, CA (US); Maya Madison, San Jose, CA (US)

(*) Notice: Subject to any disclaimer, the term of this patent is extended or adjusted under 35 U.S.C. 154(b) by 282 days.
This patent is subject to a terminal disclaimer.

(21) Appl. No.: 12/288,350

(22) Filed: Oct. 16, 2008

(65) Prior Publication Data
US 2010/0179919 A1    Jul. 15, 2010

Related U.S. Application Data

(60) Provisional application No. 60/999,238, filed on Oct. 16, 2007.

(51) Int. Cl.
*G06Q 40/00* (2012.01)

(52) U.S. Cl.
USPC .......................................................... 705/37

(58) Field of Classification Search
CPC .................................................... G06Q 40/00
USPC ......... 705/1–110; 713/193, 1–192; 709/217, 709/221–227
See application file for complete search history.

(56) References Cited

U.S. PATENT DOCUMENTS

| | | | |
|---|---|---|---|
| 2001/0051996 A1* | 12/2001 | Cooper et al. | 709/217 |
| 2007/0255965 A1* | 11/2007 | McGucken | 713/193 |
| 2008/0065532 A1* | 3/2008 | De La Motte | 705/39 |

OTHER PUBLICATIONS

Cambriage Associates, U.S. Venture Capital Index® and Selected Benchmark Statistics, Sep. 30, 2012, Cambridge Associates LLC, web, 1-17.*

* cited by examiner

*Primary Examiner* — Marissa Liu
(74) *Attorney, Agent, or Firm* — Sheppard, Mullin, Richter & Hampton LLP

(57) ABSTRACT

A technique involves providing an actual cost commitment and investing a retail value of the actual cost commitment to a student venture, and receiving a return on the retail value and a return on actual cost that is equal to the return on the retail value minus the actual cost commitment. A system constructed according to the technique may include an investment decision engine, a portfolio management engine, and a venture scholar fund operations engine. The system may further include, for example, an authentication engine and a public information engine.

11 Claims, 14 Drawing Sheets

STUDENT VENTURE MANAGEMENT

CROSS-REFERENCE TO RELATED APPLICATIONS

This application claims priority to U.S. Provisional Patent Application 60/999,238 filed Oct. 16, 2007, which is incorporated by reference.

BACKGROUND

A successful startup business venture is an aggregation of many ingredients, including an innovative business concept; entrepreneurial and management skills, knowledge, and experience; and capital funding. These elements generally are contributed by entrepreneurs, universities, and venture capital firms, respectively. Presently, a degree of disconnect exists between these actors, such that pooling their respective contributions to create and grow a successful startup business venture is a common difficulty.

In some cases there will exist one actor or ingredient but neither of the other two. In other cases, for example, venture capital firms (VCs) and entrepreneurs interact, but there are no incentive structures or instruments that benefit all actors in the VC, entrepreneur, and university micro-economy. An entrepreneur, such as a young entrepreneur or a student entrepreneur, for example, may possess an innovative new business idea, but typically will lack the business and management skills and experience, as well as the capital funding, to pursue and transform the business idea into a successful startup business venture. However, there is currently no successful structure to capture deal flow with student entrepreneurs.

VCs, for their part, must invest in ventures that will yield high returns, and often are too selective to invest in early startup business ventures. VCs with large funds cannot afford to touch smaller deals. Some may argue that early stage investors exist, but VCs do not invest at a concept stage. Technically the earlier deals have even higher yields; the lack of interest has more to do with the higher risk in dealing with younger, first-time university entrepreneurs and the fact that they have to deploy larger amounts of cash at a time due to their fund size. This presents a serious disadvantage given that many new successful companies are being formed by a young generation of CEOs during or straight out of college. VCs lack early visibility into such startup business ventures and the ability to investigate and evaluate their potential for return. VCs therefore need stronger relationships with universities in order to gain access to this increasingly promising body of student entrepreneurs.

Universities, despite their contributing the ingredients of business and management knowledge to a startup business venture to student entrepreneurs, fail to realize any part of the returns of a startup business venture founded by its students. Currently, there may be some return on investment, realized by deploying capital to a VC asset class and waiting for a return to materialize in a VC's portfolio.

Specifically, university endowments grant scholarships that enable students to obtain an education at reduced or no cost. FIG. 1 depicts a conceptual diagram 100 of a prior art endowment grant process. The diagram 100 includes a university endowment 102, an asset class 104, and current expenses 106. In the example of FIG. 1, the university endowment 102 invests (110) in the asset class 104. Typically, this involves giving money a VC asset and/or other assets. In the example of FIG. 1, the asset class 104 earns a return (112), which is given back to the university endowment 102.

In the example of FIG. 1, after the university endowment 102 receives the return, the university endowment can pay (114) current expenses 106. However, at this point, there is no return (116) on the payment of current expenses 106.

A university endowment may have scholarships that constitute an expense or suck cost that bears no return to the university, except should an alum make a donation to the university endowment at some indeterminable future point in time. Even in such a case, to trace the donation directly back to the scholarship would be highly speculative, and thus future return on a scholarship is difficult if not impossible to measure. In terms, then, of realizing returns on a startup business venture to which a university has directly contributed, the university is cut out of the loop. Of course, the university may indirectly get a return by investing in VC assets. However, since no one really invests in university entrepreneurs, this can be construed to mean that the university is, for all practical purposes, cut out of the loop entirely.

A return on the payment of current expenses would be similar to earning a return for paying bills, or a bill collector marking down that you have paid and invests in the stock market for you. Since this seems like a natural state of affairs, no effort has been made to change the status quo. The foregoing examples of the related art and limitations related therewith are intended to be illustrative and not exclusive. Other limitations of the related art will become apparent upon a reading of the specification and a study of the drawings.

The foregoing examples of the related art and limitations related therewith are intended to be illustrative and not exclusive. Other limitations of the related art will become apparent upon a reading of the specification and a study of the drawings.

SUMMARY

The following examples and aspects thereof are described and illustrated in conjunction with systems, tools, and methods that are meant to be exemplary and illustrative, not limiting in scope. In various examples, one or more of the above-described problems have been reduced or eliminated, while other examples are directed to other improvements.

A technique for implementing a student venture involves providing an actual cost commitment and investing a retail value of the actual cost commitment to a student venture, and receiving a return on the retail value and a return on actual cost that is equal to the return on the retail value minus the actual cost commitment. A system constructed according to the technique may include an investment decision engine, a portfolio management engine, and a venture scholar fund operations engine. The system may further include, for example, an authentication engine and a public information engine.

BRIEF DESCRIPTION OF THE DRAWINGS

The following figures are intended to illustrate, by way of example but not limitation, aspects of techniques described in this paper.

DETAILED DESCRIPTION

In the following description, several specific details are presented to provide a thorough understanding. One skilled in the relevant art will recognize, however, that the concepts and techniques disclosed herein can be practiced without one or more of the specific details, or in combination with other components, etc. In other instances, well-known implementations or operations are not shown or described in detail to avoid obscuring aspects of various examples disclosed herein.

Figure 1:
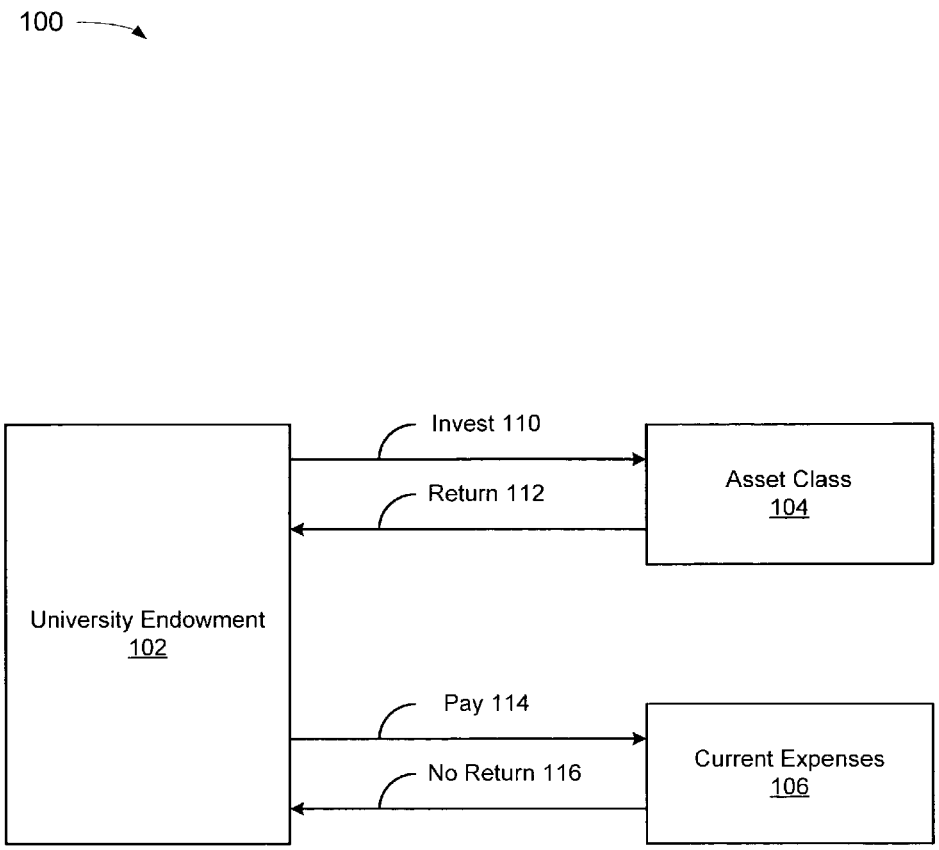
FIG. 1 depicts a conceptual diagram of an example of a prior art endowment grant process.
Figure 2:
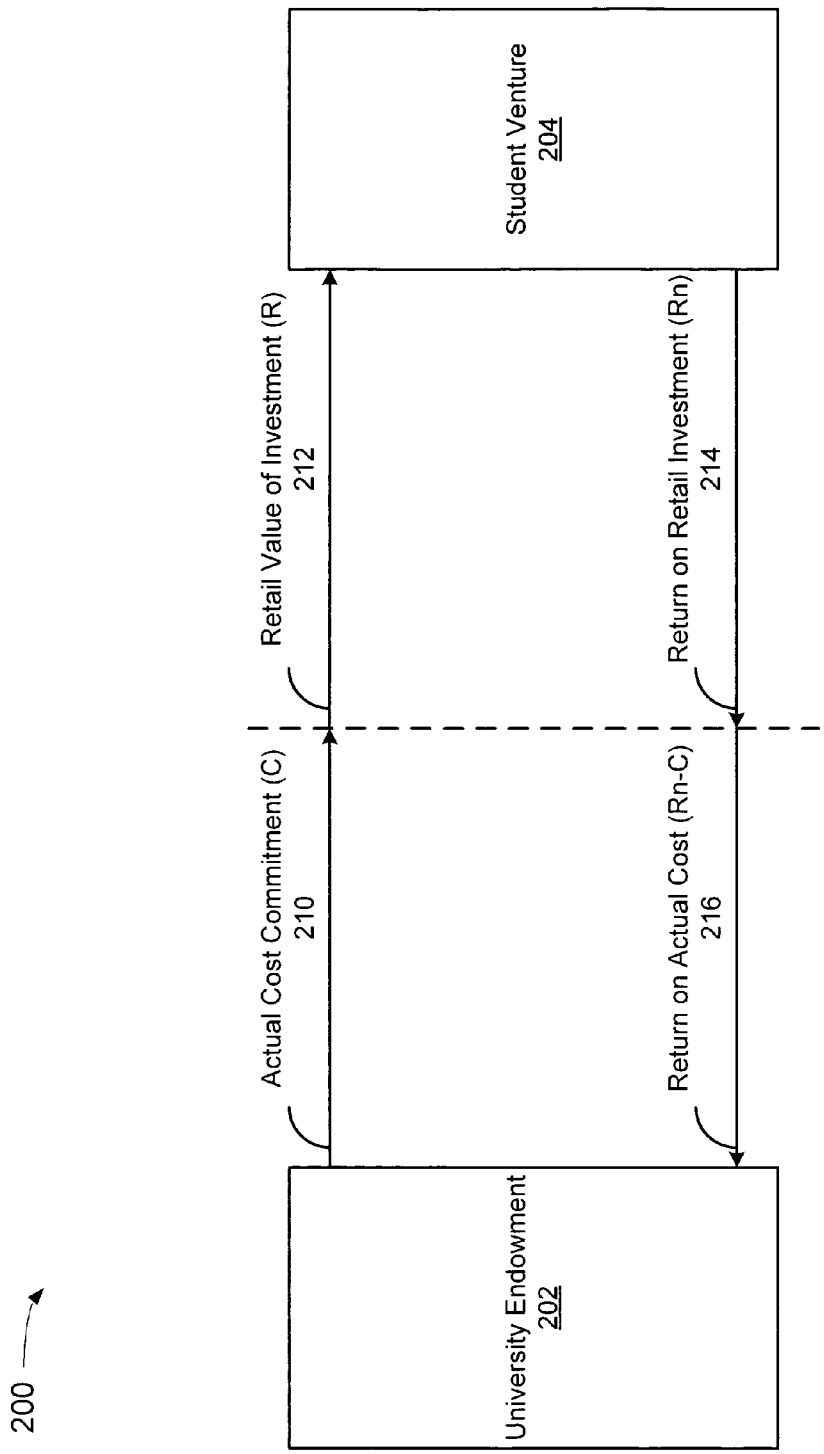
FIG. 2 depicts a conceptual diagram of an example of a university endowment student venture transaction.

FIG. 2 depicts a conceptual diagram 200 of an example of a university endowment student venture transaction. The diagram 200 includes a university endowment 202 and a student venture 204.

In the example of FIG. 2, the university endowment 202 provides an actual cost commitment (C) 210, where C represents actual cost to the university. However, the face or retail investment value of scholarship commitments will be the actual amount charged to students. This is represented in the diagram 200 as a retail value of investment (R) 212, where R represents the retail value of the scholarship commitments. As is apparent in the diagram 200, the value of the investment is higher than the actual commitment. So, the university endowment 202, in a sense, has already earned a return R−C=P, where P represents the premium. This assumes the retail value exceeds the actual cost of providing an education to a student, such that the university has a profit margin on the student. However, even if the actual value exceeds the retail value, it may be possible to make up for the reduced investment value through the student venture 204.

When providing capital commitments in the form of scholarship commitments, the university need only commit to providing the actual cost of education per student. However, the advantageous perception will be that it has contributed scholarship commitments worth the apparent retail value of its educational services. The university thus effectively also earns a return based on its profit margin for providing educational services. This is particularly advantageous for prestigious and selective institutions that can command a price premium for their educational services.

Following the initial investment in the student venture 204, assuming even moderate success, a return is expected. In the example of FIG. 2, the return on retail investment (Rn) 214 is a multiple, n, times the retail value of investment. The return on actual cost (Rn−C) 216, is the return on investment from the perspective of the university endowment 202. In other words, the investment in the student venture is the retail cost of the education, while the return on the investment is a multiple of the retail value of the education less the actual cost. That means even at 1×, just returning a "capital equivalent," the university endowment 202 has already earned a premium R−C=P.

Figure 3:
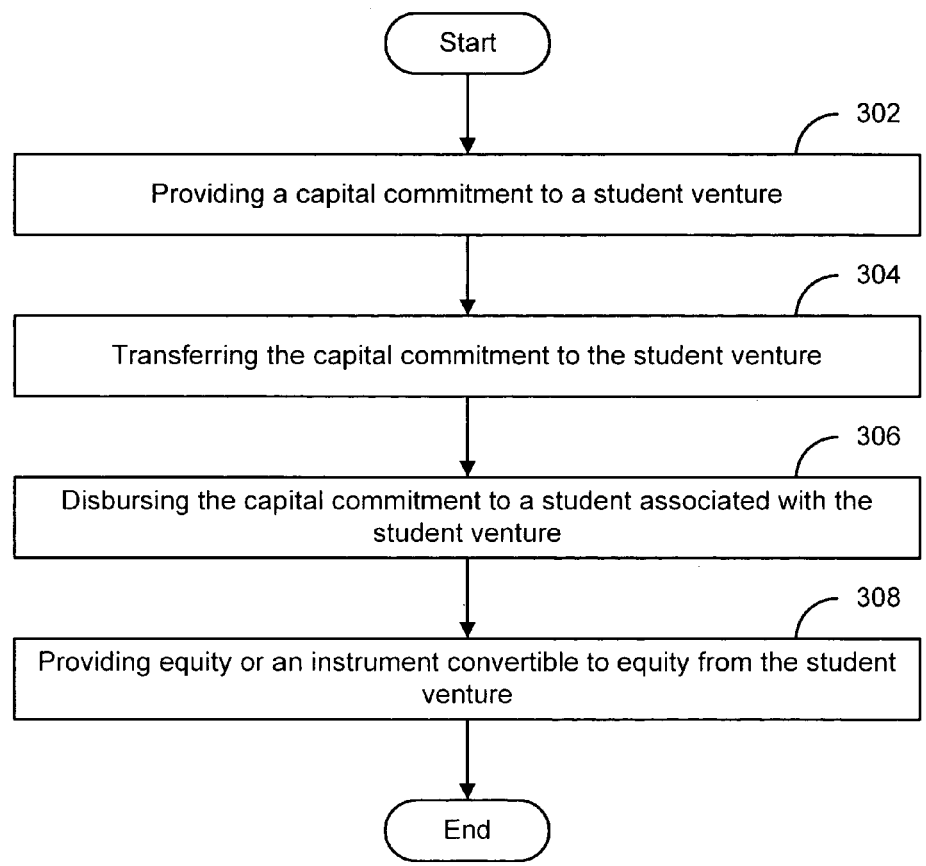
FIG. 3 depicts a flowchart of an example of a method of investing in a student venture.

FIG. 3 depicts a flowchart 300 of an example of a method of investing in a student venture. The method is organized as a sequence of modules in the flowchart 300. However, it should be understood that these and modules associated with other processes and methods described herein may be reordered for parallel execution or into different sequences of modules.

In the example of FIG. 3, the flowchart 300 starts at module 302 with providing a capital commitment to a student venture. The capital commitment may come in the form of cash or a cash equivalent, and may come from any applicable entity, such as a VC, LP, individual, or other entity. The capital commitment may include a scholarship. A scholarship that is provided in association with a student venture is referred to in this paper as a "venture scholarship."

In the example of FIG. 3, the flowchart 300 continues to module 304 with transferring the capital commitment to the student venture. In this way, the capital commitment serves as an investment in the student venture.

In the example of FIG. 3, the flowchart 300 continues to module 306 with disbursing the capital commitment to a student associated with the student venture. The capital commitment may be disbursed to the student on a predetermined schedule, based upon milestones achieved in the student venture, or upon other predetermined or agreed-upon criteria. The student venture is in essence a startup company run by university students. However, it should be noted that the student venture need not be a formal legal entity.

In the example of FIG. 3, the flowchart 300 continues to module 308 with providing equity or an instrument convertible to equity from the student venture. Like traditional venture capital transactions, in exchange for the capital commitment, a VC may receive equity or an instrument convertible to equity from the student venture. Instruments convertible to equity, such as warrants and convertible notes, reflect a contemplation of student ventures that do not exist as formal legal entities and that have no present equity to grant to the VC. However, this is not the only concern. It is common practice to issue convertible debt or a bridge note for early stage companies to avoid the need to contemplate a valuation at such an early stage. The convertible or bridge note converts based on a subsequent round of institutional investment in the venture. This way the later stage VC set the valuation and the early stage entity gets a discount to that based on the terms of the note. This happens frequently in angel investing because entrepreneurs feel it is more accurate to have VCs price a round instead of angels, but angels should get some reward since they invested earlier than a VC would.

Using techniques described in this paper, VC firms may be given constant and early visibility and access to student entrepreneurs, a promising new source of deal flow. Additionally, investment costs may be kept relatively low. Earlier stage is typically more risky and more rewarding for VC firms. Advantageously, risk reduction or rather risk compensation can come from tax benefits over traditional VC. This makes it easier to get endowment funds invested (a right typically only reserved for the top tier firms). So one can participate at higher risk/reward venture at lower adjusted cost. For example, while still gaining equity in an investment as a traditional VC transaction, VCs can pay a discounted rate for skilled labor to run the venture, as generally it is cheaper to pay for a student's education than a skilled professional's salary in the work force.

Figure 4:
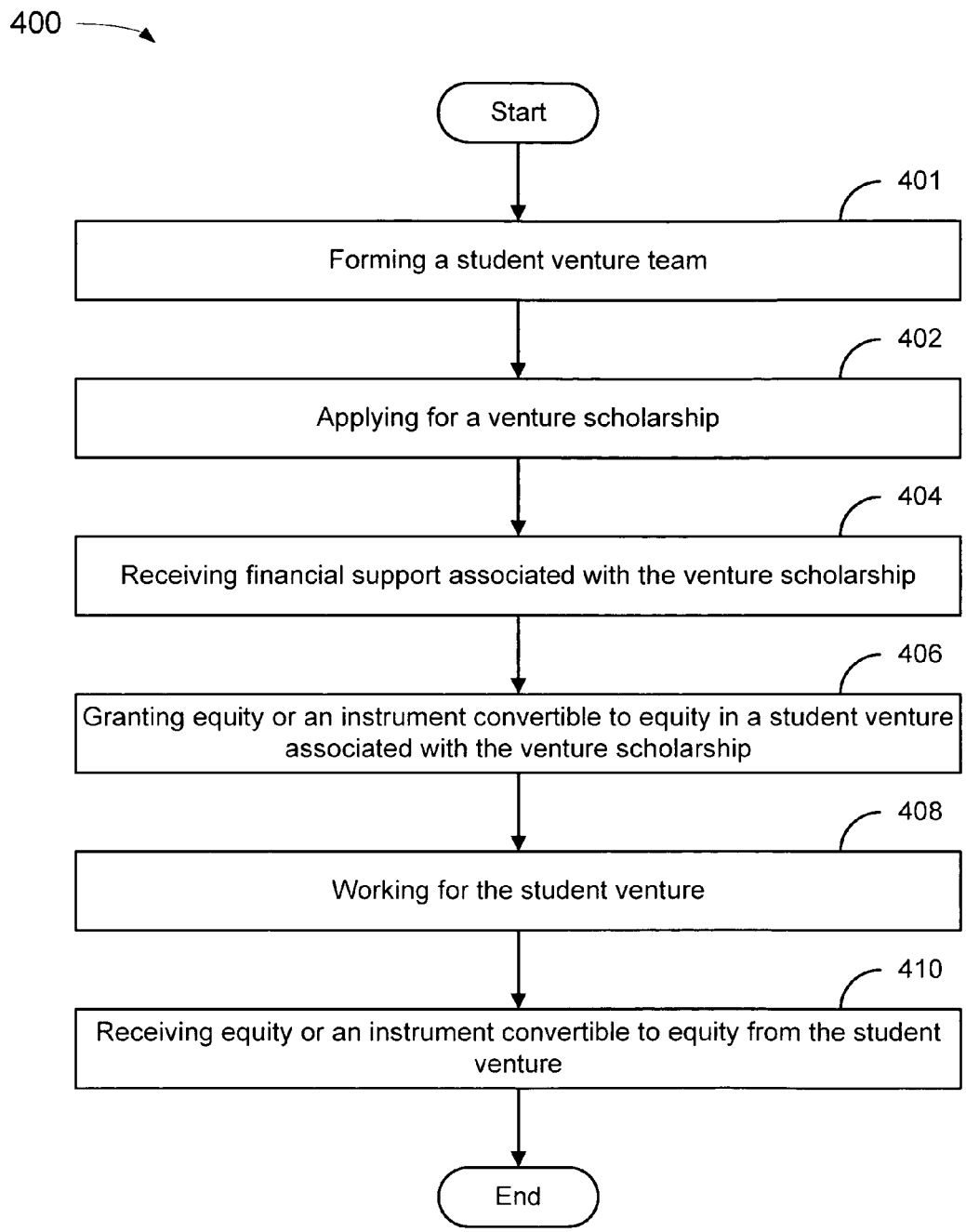
FIG. 4 depicts a flowchart of an example of a method of participating in a student venture.

FIG. 4 depicts a flowchart 400 of an example of a method of participating in a student venture. In the example of FIG. 4, the flowchart 400 starts at module 401 with forming a student venture team. This can include matching with teammates using a venture scholar network (e.g., an online matchmaker). The team and/or team members may or may not have patentable inventions. Depending upon the implementation or configuration, there may be an option to file for patent protection in a country of origin, start a company in the country of origin, and assign patent rights to that company.

In the example of FIG. 4, the flowchart 400 continues to module 402 with applying for a venture scholarship. A student (or prospective student) may apply for a venture scholarship by, for example, submitting a proposal or a business plan for a student venture. Unlike traditional scholarships, the venture scholarship may or may not be based upon financial need or academic performance, but rather on the business merits of a proposal for the student venture. If the venture scholarship application is accepted, team members can negotiate for an equity exchange for capital in the student venture or, if patent rights were assigned to a company in a team member's country of origin, trade equity in the company for capital in the student venture. At some point before, during, or after the application process, the student venture can be matched with one or more mentors, and milestones can be developed with the help of the mentor(s) and partners in the student venture and/or venture fund.

In the example of FIG. 4, the flowchart 400 continues to module 404 with receiving financial support associated with the venture scholarship. If the student's proposal for a student venture is accepted, the student may receive financial support, for example, in the form of a venture scholarship. The venture scholarship may cover the student's tuition, room and board, or other fees, and allocations for venture expenses not covered through a venture lab. Venture lab is a way to, for example, spread fixed cost across many student ventures. Thus, the student venture can be used to leverage space in a venture lab and to enable the team members to engage in entrepreneurship curriculum and boot camps. Additional funds outside of the venture scholarship itself may be used to run the student venture, such as, by way of example but not limitation, another venture.

In the example of FIG. 4, the flowchart 400 continues to module 406 with granting equity or an instrument convertible to equity in a student venture associated with the venture scholarship. In exchange for the venture scholarship, the student grants equity or an instrument convertible to equity in the student venture to a VC or other investor. In addition, the student may or may not have an initial amount of equity in the student venture. The student venture need not be a legal entity.

In the example of FIG. 4, the flowchart 400 continues to module 408 with working for the student venture. The student venture is similar to other business ventures except as described in this paper. One specific difference from other business ventures is that student ventures "hire" students instead of employees. Thus, in addition to granting equity in the student venture, the student must also work for the student venture while attending the university, much like an internship or part-time job. The student venture matures by getting customers, selling products, attracting users, etc.

In the example of FIG. 4, the flowchart 400 continues to module 410 with receiving equity or an instrument convertible to equity from the student venture. The student's receipt of equity or an instrument convertible to equity in the student venture may be contingent upon the student satisfying specified milestones, or according to some other vesting schedule. If the student venture is within allowable incubation times and acceptable milestone ranges, milestones can be further developed as the student venture matures. If not, the team members can potentially take on funding from other VCs. If the student venture is successful after the allowable incubation time, it may be possible to reach a liquidity event. If not, the team members can either re-apply with a new student venture or quit.

Figure 5:
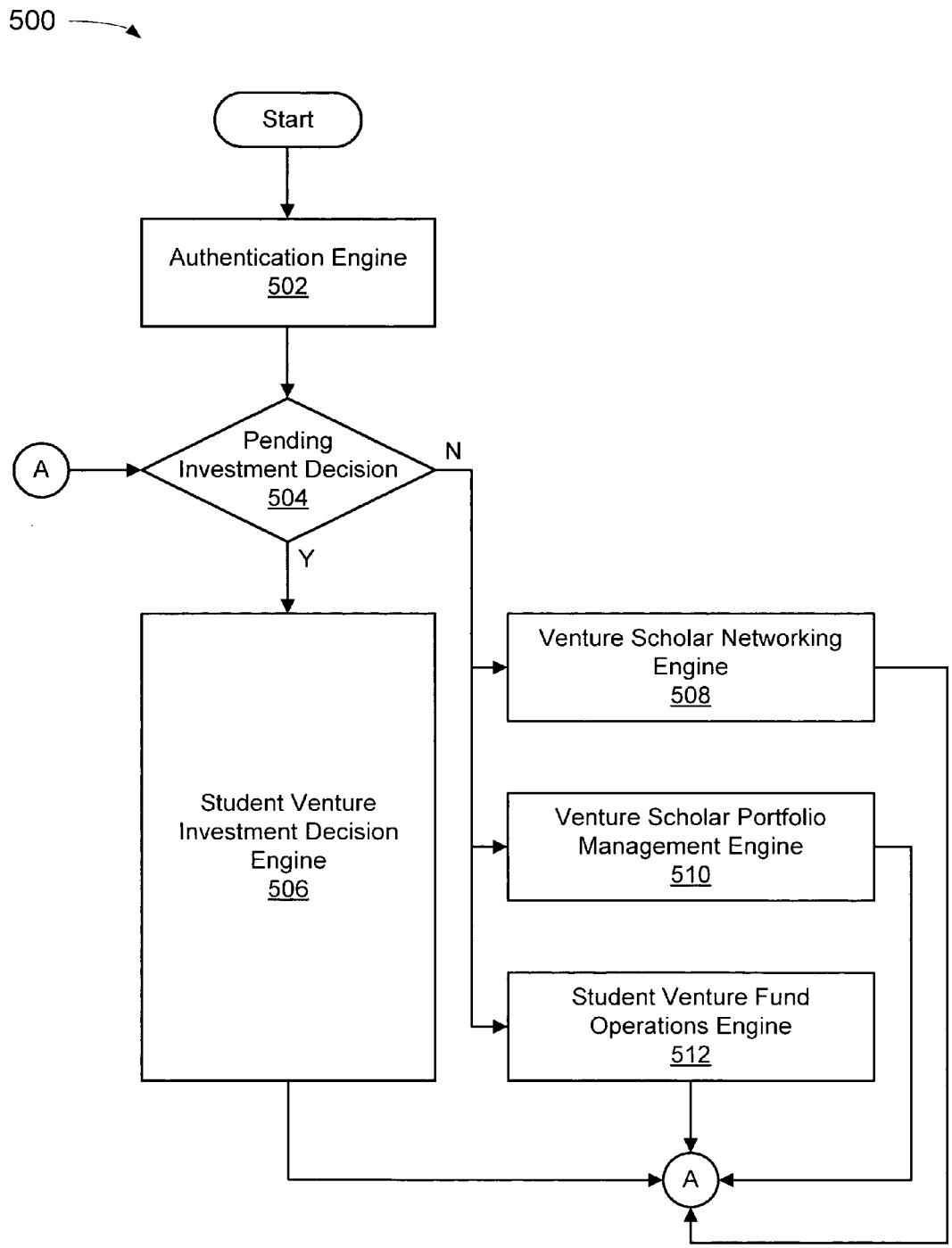
FIG. 5 depicts a flowchart of an example of a method of student venture management.

The principles described thus far with reference to FIGS. 2-4 can be implemented in engines as illustrated in FIG. 5. FIG. 5 depicts a flowchart 500 of an example of a method of student venture management. In the example of FIG. 5, the flowchart 500 starts with an authentication engine 502. The authentication engine 502 can be implemented as hardware and/or as software implemented in hardware. The type of authentication that may be performed can establish what other engines may be accessible to a particular user.

As used in this paper, an engine is a combination of instructions and a processor configured to execute the instructions. Any applicable known or convenient processor technology can be used. A special-purpose engine processor can include a processor with relevant instructions to manipulate data in a manner that is appropriate to the techniques described in this paper. In a typical implementation, an engine will be associated with at least some instructions that are executed by the processor, though it is possible that the processor would be implicit in that the instructions are, for example, implemented in a solid-state device without a conventional processor or executables stored in memory. More likely, a processor is specially configured to carry out tasks associated with the relevant engine. Configuration of the processor can occur at the time of manufacture, later in the form of "read-only" instructions executable by the processor and/or dynamically in the form of software loaded into appropriate hardware registers for execution by the processor. A processor is frequently shared with instruction sets from various programs, some of which may not be related to the relevant engine, and instructions associated with the relevant engine, other than perhaps the most trivial, typically cannot be kept in hardware registers concurrently. Sometimes, due to the size of the instruction set and/or the memory load, instructions associated with the relevant engine cannot even be kept in cache or memory (e.g., RAM), and must instead be kept in non-volatile storage (e.g., a hard disk).

In the example of FIG. 5, the flowchart 500 continues to decision point 504 where it is determined whether there is a pending investment decision. If it is determined that there is a pending investment decision (504-Y), then the flowchart 500 continues to an investment decision engine 506. The investment decision engine is described in more detail with reference to FIGS. 6-11. The flowchart 500 then returns to decision point 504 to determine whether there is another pending investment decision.

If it is determined that there is not a pending investment decision (504-N), then the flowchart 500 continues to either the venture scholar networking engine 508, a venture scholar portfolio management engine 510, or a student venture fund operations engine 512. The venture scholar networking engine 508 is described in more detail with reference to FIG. 12. The venture scholar portfolio management engine 510 is described in more detail with reference to FIG. 13. The student venture fund operations engine 512 is described in more detail with reference to FIGS. 14 and 15.

Figure 6:
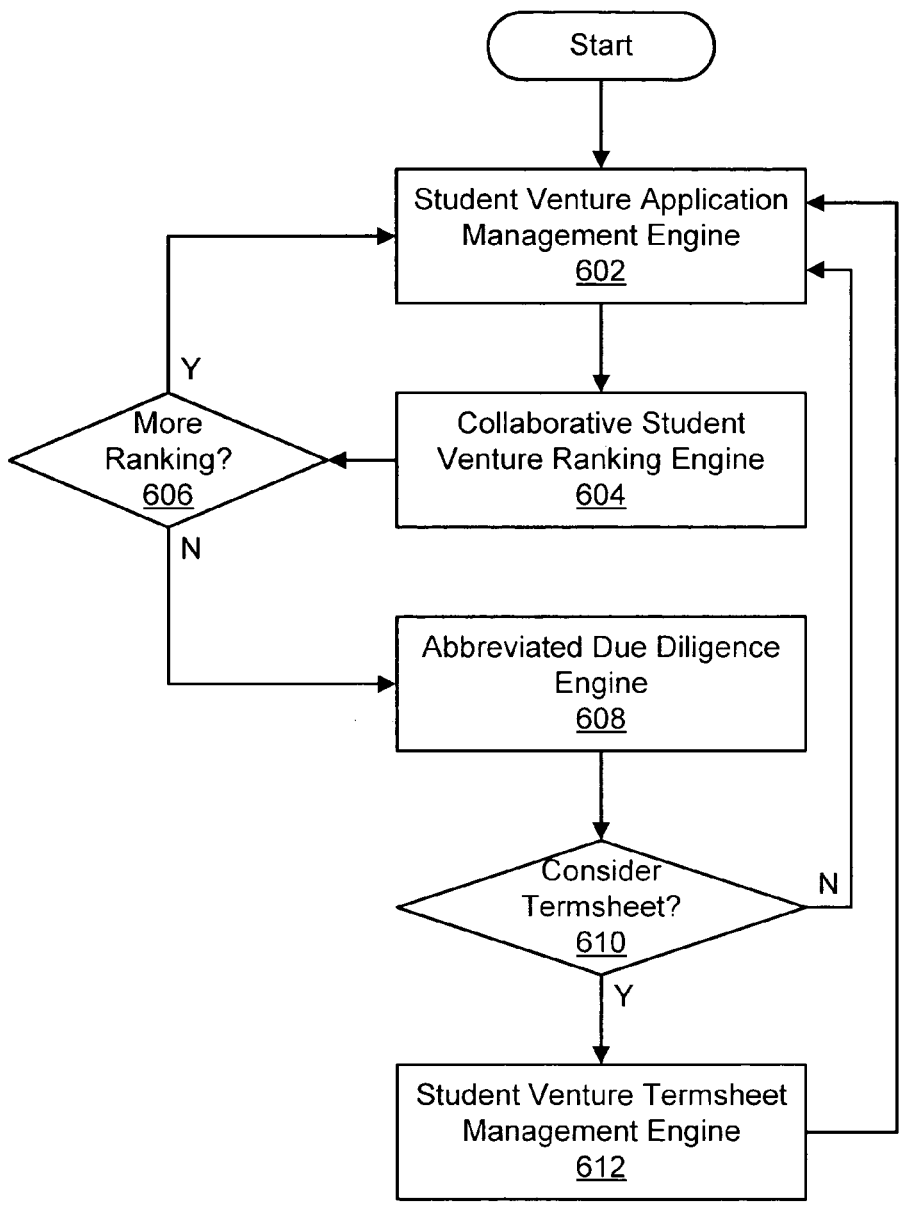
FIG. 6 depicts a flowchart of an example of an investment decision method.

FIG. 6 depicts a flowchart 600 of an example of an investment decision method. In the example of FIG. 6, the flowchart 600 starts with a student venture application management engine 602, which is described in more detail with reference to FIG. 7.

In the example of FIG. 6, the flowchart 600 continues with a collaborative student venture ranking engine 604, which is described in more detail with reference to FIG. 8.

In the example of FIG. 6, the flowchart 600 continues to decision point 606 where it is determined whether there are more rankings to perform. If it is determined that there are more rankings to perform (606-Y), then the flowchart 600 returns to the student venture application management engine 602 and continues as described above. If, on the other hand, it is determined that there are no more rankings to perform (606-N), then the flowchart 600 continues with an abbreviated due diligence engine 608, which is described in more detail with reference to FIG. 9.

In the example of FIG. 6, the flowchart 600 continues to decision point 610 where it is determined whether it is time to consider a termsheet. If it is determined that it is not time to consider a termsheet (610-N), then the flowchart 600 returns to the student venture application management engine 602 and continues as described above.

If, on the other hand, it is determined that it is time to consider a termsheet (610-Y), then the flowchart 600 continues with a student venture termsheet management engine 612, which is described in more detail with reference to FIG. 10. The student venture termsheet management engine 612 may generate a termsheet or it may fail to generate a termsheet (e.g., if relevant parties do not agree on the terms). It is typically "time to consider a termsheet" when a VC fund decides to issue a termsheet.

Although there is no end to the flowchart 600 as depicted in the example of FIG. 6, it is, of course, possible to conclude a given transaction and finalize a termsheet. In any case, in the example of FIG. 6, the flowchart 600 returns to the student venture application management engine 602 to modify the current transaction or to start a different transaction.

Figure 7:
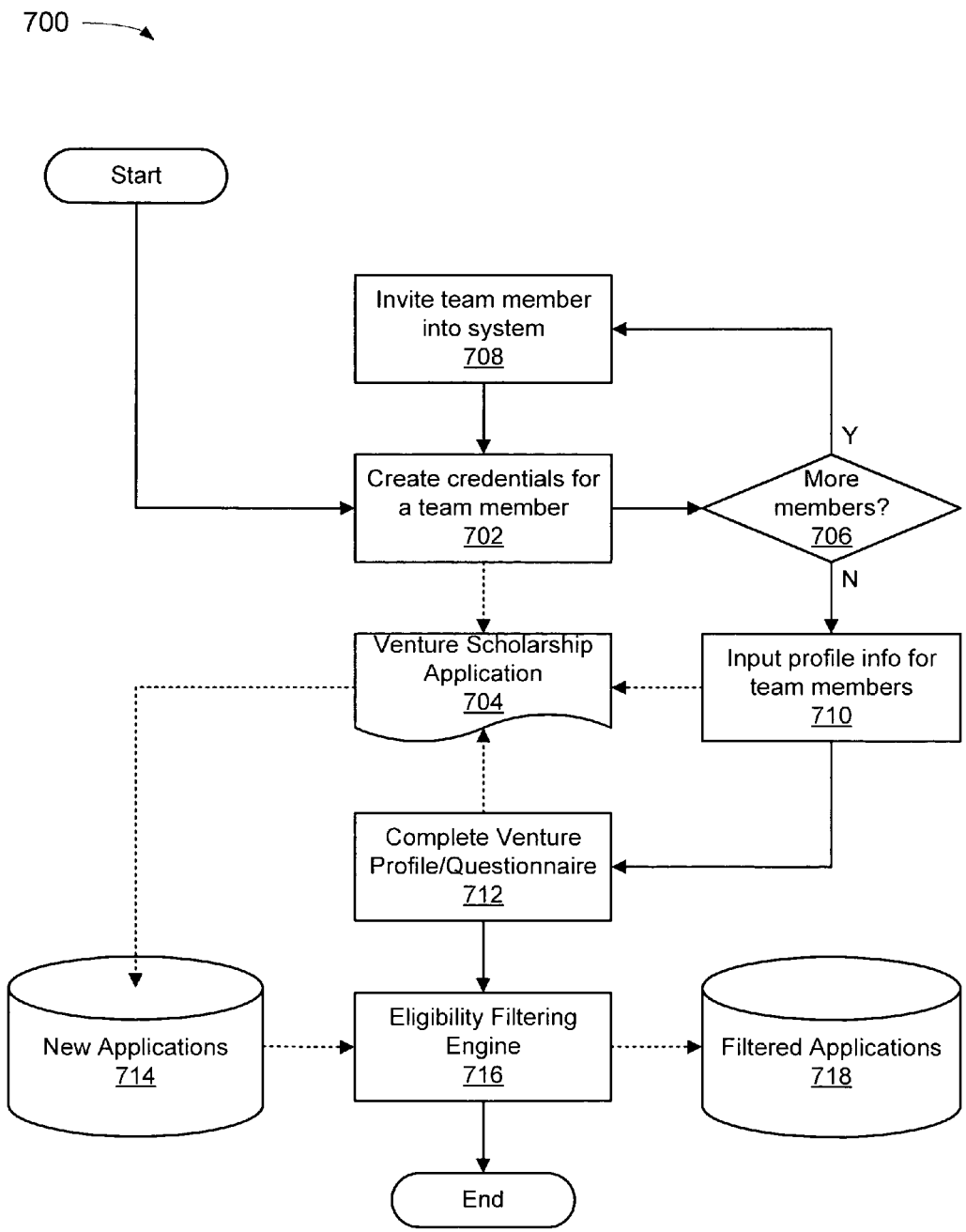
FIG. 7 depicts a flowchart of an example of a student venture application management method.

FIG. 7 depicts a flowchart 700 of an example of a student venture application management method. Prior to the start of the flowchart 700, depending upon implementation and/or embodiment, a team leader may be required to authenticate (see, e.g., the authentication engine 502 in FIG. 5). For example, it may be desirable to include a venture scholar applicant registration, authentication, and login.

In the example of FIG. 7, the flowchart 700 starts at module 702 with creating credentials for a team member. Credentials can include, for example, login and authentication credentials. The first team member for which credentials are created may be referred to as the team leader, though a distinction between the team leader and other team members may or may not be made once the team is assembled. The credentials can be stored as part of a venture scholarship application, as indicated by the dashed arrow from the module 702. It may be noted that where the team leader is required to authenticate before the flowchart 700 starts, the team leader can either use credentials that are at least partially different from those created at the module 702, or the module 702 can be skipped for the team leader if the team leader has sufficient credentials that would have been created at the module 702.

In the example of FIG. 7, the flowchart 700 includes a dashed arrow from the module 702 to a venture scholarship application 704. The dashed arrow is intended to indicate that data input and/or generated at the module 702 becomes part of the venture scholarship application 704. The dashed arrow is not intended to indicate an order of flow in the flowchart 700, but rather act as a conceptual indicator of the data known at a given point. The venture scholarship application 704 may exist as a data structure in memory (or a buffer, cache, register, or other applicable known or convenient storage location), a combination of associated data structures in memory, or even as a combination of unrelated data structures that are later associated. The duration with which the venture scholarship application 704 exists in memory is largely irrelevant. For example, data associated with the venture scholarship application 704 could be relatively quickly written to non-volatile storage as it is received, the venture scholarship application 704 could be built completely in memory before being stored in non-volatile storage, or somewhere in between.

In the example of FIG. 7, the flowchart 700 continues to decision point 706 where it is determined whether there are more members to add to the venture scholarship team. If it is determined that there are more members to add to the venture scholarship team (706-Y), then the flowchart 700 continues to module 708 with inviting the team member into the system. The invitation need not be a formal invitation, but rather is any known or convenient mechanism for prompting a user to provide credentials. The module 708 could even be skipped if the system is capable of acquiring appropriate data without inviting the team member. Then the flowchart 700 continues to the module 702 and continues as described previously for the current team member.

If, on the other hand, it is determined that there are no more members to add to the venture scholarship team (706-N), then the flowchart 700 continues to module 710 with inputting profile information for team members. The dashed arrow from the module 710 to the venture scholarship application 704 is intended to indicate that data input and/or generated at the module 710 becomes part of the venture scholarship application 704.

Profile information for team members can include, for example:
1. Name/Age/Sex;
2. Social Security Number;
3. GPA (general and in major);
4. Major;
5. Output from background check;
6. Psychographic analysis (like MBTI typing);
7. References (professor and previous job);
8. Job experience (scored as it relates to a proposed venture);
9. Mentor preferences;
10. Other profile information.

There may also be collective profile information, which can include, for example:
1. Missing roles;
2. Collective psychographic profile (possibly indicating potential team dysfunctionality);
3. Collective skill set (should be appropriate for the proposed venture);
4. Mentor preferences (potentially offsetting team's collective weaknesses).

In the example of FIG. 7, the flowchart 700 continues to module 712 with completing a venture profile/questionnaire. The dashed arrow from the module 712 to the venture scholarship application 704 is intended to indicate that data input and/or generated at the module 712 becomes part of the venture scholarship application 704. The dashed arrow from the venture scholarship application 704 to a new applications database 714 is intended to indicate that the venture scholarship application 704 is stored as an entry in the new applications database 714. It may be noted that the data could have been stored in the new applications database 714 more or less as it was received (e.g., after creating credentials for a team member at the module 702, the credentials could have been stored in the new applications database 714).

The new applications database 714 can be implemented as hardware and/or software implemented in hardware. As used in this paper, a database can include a traditional database, a table, an array, or any other applicable data structure capable of storing data in a manner that is at least somewhat convenient to a user of the database. A database can optionally include a database interface that can be implemented in whole or in part on the hardware device on which data of the database is stored, or in whole or in part on a device that is accessing the data. As used in this paper, a database can be a centralized repository (e.g., a device that stores all of the data of the database) or a distributed repository (e.g., multiple devices, each storing a portion of the database). Data can be stored in any applicable memory, including non-volatile storage, volatile storage (e.g., random access memory (RAM)), cache, or registers. Reading and writing data requires a processor, though any applicable known or convenient processor technology can be used. A special-purpose database processor can include a processor with relevant instructions, whether stored in hardware or in software implemented in hardware, to read and write data in a manner that is appropriate to the techniques described in this paper.

The new applications database 714 includes entries, such as database records, table elements, array elements, or any other applicable elements that can be part of a venture scholarship application, along with associated data, if applicable. As used in this paper, it is understood that some types of entries in databases (e.g., objects, arrays, etc.) can have sub-entries while other types of entries (e.g., constants) may not have sub-entries. It can be advantageous to break down entries into sub-entries, such as fields, or any other applicable elements.

In the example of FIG. 7, the flowchart 700 continues to an eligibility filtering engine 716. The dashed arrow from the new applications database 714 to the eligibility filtering engine 716 is intended to indicate that the eligibility filtering engine 716 considers the venture scholarship application 704 (and perhaps other applications). The dashed arrow from the eligibility filtering engine 716 to a filtered application database 718 is intended to indicate that eligible applications are stored in the filtered applications database 718. It is also possible to implement the eligibility filtering engine 716 such that it deletes non-eligible entries from the new applications database 714 (not shown), or perhaps this could be taken care of by marking non-eligible entries for deletion and using a periodic (e.g., delete marked entries annually after a review, or delete the entire new applications database 714 after the student body is selected to prepare for a new round of admissions) or occasional (e.g., after an arbitrarily-timed review of non-eligible entries) clean-up routine.

Eligibility requirements for a team can include, for example:
1. The team member must be a matriculating student earning either a master's or a PhD degree in engineering or earning a MBA with an undergraduate engineering degree.
2. The team member must take or have taken certain classes or met other curriculum-related requirements.
3. The team member must have a minimum GPA.
4. The team member cannot have a job while in the program.
5. The team member must have the unrestricted right to work in the U.S. with company sponsorship, unless there is a legal work-around, one of which is discussed later in this paper.
6. The team must include two to four members.
7. The business idea cannot be related to any master's thesis or any school-owned idea.
8. The business idea must be in a hot investment space for the investment horizon. These "sector requirements" can change based upon a general portfolio makeup, expertise of partners, investment market conditions, etc.

These eligibility requirements can change over time, and they can be removed or new ones added. Requirements can vary depending upon other qualifications. For example, GPA requirements might be lower if a team member has certain work experience.

It should be noted that the new applications database 714 and the filtered applications database 718 are conceptual. For example, the eligibility filtering engine 718 might simply check an eligibility field associated with the venture scholarship application 704 in what might be considered a single database, thereby conceptually "adding" an entry associated with the venture scholarship application 704 to the filtered applications database 718 and "removing" the entry from the new applications database 714. The databases could also have characteristics that would cause some of skill in the relevant art to consider them "separate" databases. The actual configuration is not critical, though, due to the nature of venture scholarships, meeting eligibility requirements (e.g., to receive a scholarship, a person must be a student) may be deemed an important consideration. It is likely that those who participate in collaborative venture ranking would find it less than useful to be given the opportunity to consider student ventures associated with non-eligible team members. Conceivably, depending upon the implementation and/or configuration, if an entry associated with the venture scholarship application 704 is associated with at least one eligible team member, the application may or may not be added to the filtered applications database 716.

Figure 8:
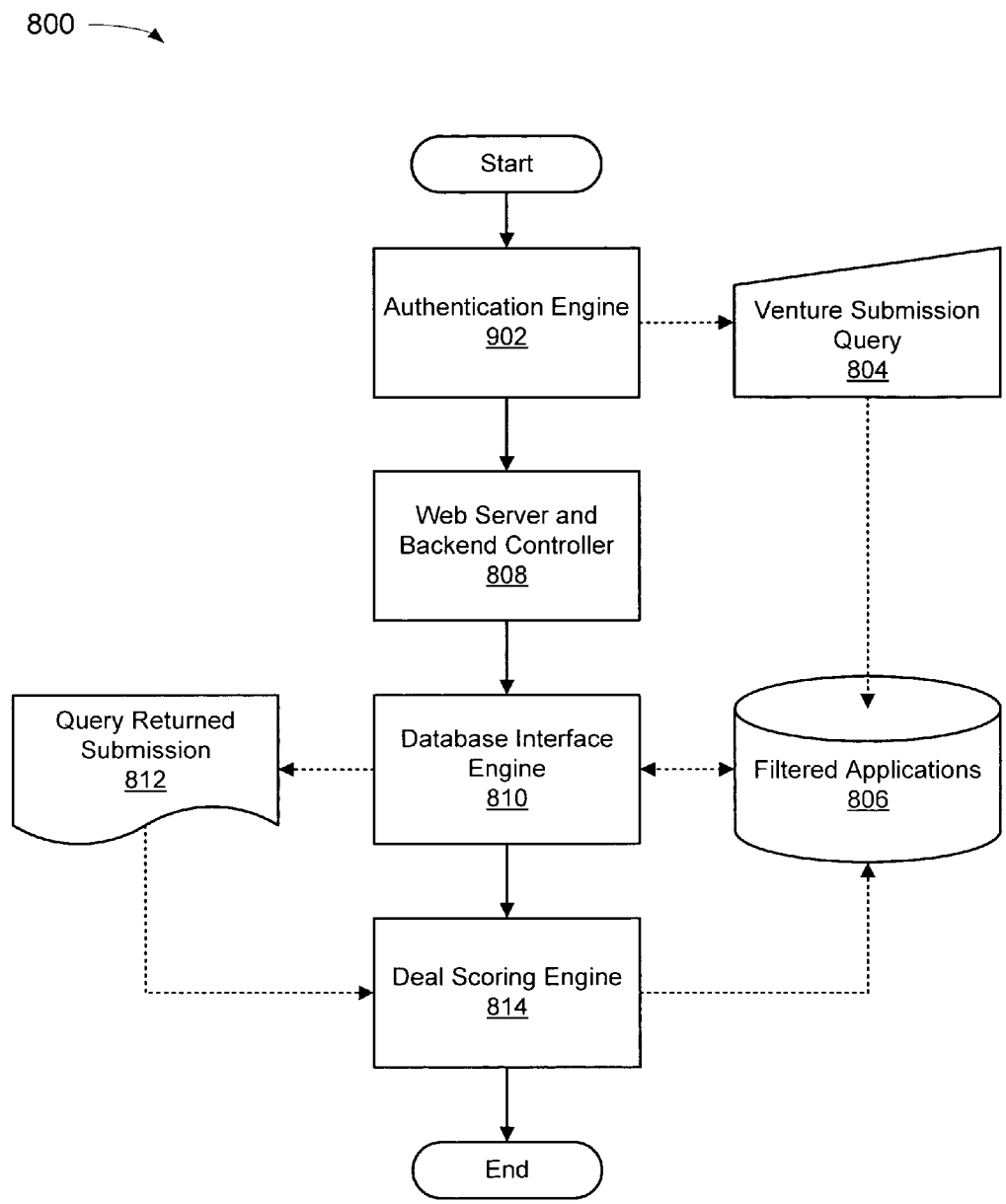
FIG. 8 depicts a flowchart of an example of a collaborative student venture ranking method.

FIG. 8 depicts a flowchart 800 of an example of a collaborative student venture ranking method, such as could be implemented by a collaborative student venture ranking engine. In the example of FIG. 8, the flowchart 800 starts at authentication engine 802. The authentication engine 802 is responsible for largely configuration-related procedures that ensure only appropriately qualified entrepreneurs can submit a business plan (see, e.g., FIG. 7) and only appropriately qualified partners and/or advisors can submit a venture submission query 804. The authentication engine 802 can, for example, register, authenticate, verify username/password, etc. The authentication engine 802 can facilitate submission of the business plan from entrepreneurs to create a filtered applications database 806 (see, e.g., FIG. 7). The authentication engine 802 can facilitate submission of the venture submission query 804 to the system for the purpose of querying the filtered applications database 806.

In the example of FIG. 8, the flowchart 800 continues to a web server and backend controller 808. The web server and backend controller 808 can be implemented as hardware and/or software implemented in hardware. As used in this paper, a server can refer to a process running on a computing device, or to the computing device itself. In the latter case, the computing device can have multiple distinct server processes running simultaneously, but it should be clear from context which server process is being discussed at a given time. To be useful, a server is coupled to a client such that communication is facilitated between the server and the client. As used in this paper, the term server may or may not refer to a web server. A web server is configured to operate with the protocols of the World Wide Web. Optionally, a web server can be part of an Internet Service Provider (ISP) system that provides access to the Internet for client systems.

As is known to those of skill in the relevant art, a server typically interacts with a client (not shown in FIG. 8). The client is associated with an entrepreneur, partner, advisor, or other party, and facilitates interaction with the server. The client can be implemented as hardware and/or software implemented in hardware. As used in this paper, a client can refer to a process running on a computing device, or to the computing device itself. In the latter case, the computing device can have multiple distinct client processes running simultaneously, but it should be clear from context which client process is being discussed at a given time. To be useful, a client is coupled to a server such that communication is facilitated between the server and the client.

In the example of FIG. 8, the flowchart 800 continues to the database interface engine 810. The database interface engine 810 may or may not include a traditional database interface (e.g., an Oracle® database interface), depending upon the implementation. The database interface engine 810 stores an entry associated with the business plan in the filtered applications database 806 (see, e.g., FIG. 7). The database interface engine 810 can also query the filtered applications database 806 using the venture submission query 804, or data associated with the venture submission query 804. The results of the query are provided in a query returned submission 812.

Depending upon the implementation, the database interface engine 810 can perform applicable procedures that make the data in the filtered applications database 806 more useful to users of the system. This can include filtering entries according to certain criteria, tagging data, performing statistical analysis, and other activities that can occur in the background according to periodic or spontaneous procedures, or upon receipt of new data or queries. The database interface engine 810 can store queries, such as the venture submission query 804 or data associated with the venture submission query 804, for later use. For example, a partner might want to select a deal from a previous query at any point during a deliberation process. The database interface engine 810 may also be capable of removing entries if, by way of example but not limitation, scores associated with the entry are too low.

In the example of FIG. 8, the flowchart 800 continues to deal scoring engine 814. Scoring may be according to various criteria, such as, by way of example but not limitation, business concept of submission, market for submission, intellectual property fences, demonstrated customer acceptance, competition strength, capital requirements, perceived risks, magnitude of uncertainty, team strength, venture strategy, perceived exit potential, time to market, other attributes. Scores can include annotations and notes, as well. Users of the system, typically non-partners, may also answer questionnaires about applications, which can be used to help score student venture applications (see, e.g., FIG. 9 for an example of a questionnaires database). It may be desirable to include a mechanism to verify with a party that they submitted a score or answers to a questionnaire, and to certify truthfulness. The scoring is then associated with the relevant filtered applications database 806 entry, as is indicated in the example of FIG. 8 by the dashed line from the deal scoring engine 814 to the filtered applications database 806. Partners may later update scores using the answers provided in questionnaires, changing the weight associated with questions in the questionnaires, considering comments, or according to other criteria.

Figure 9:
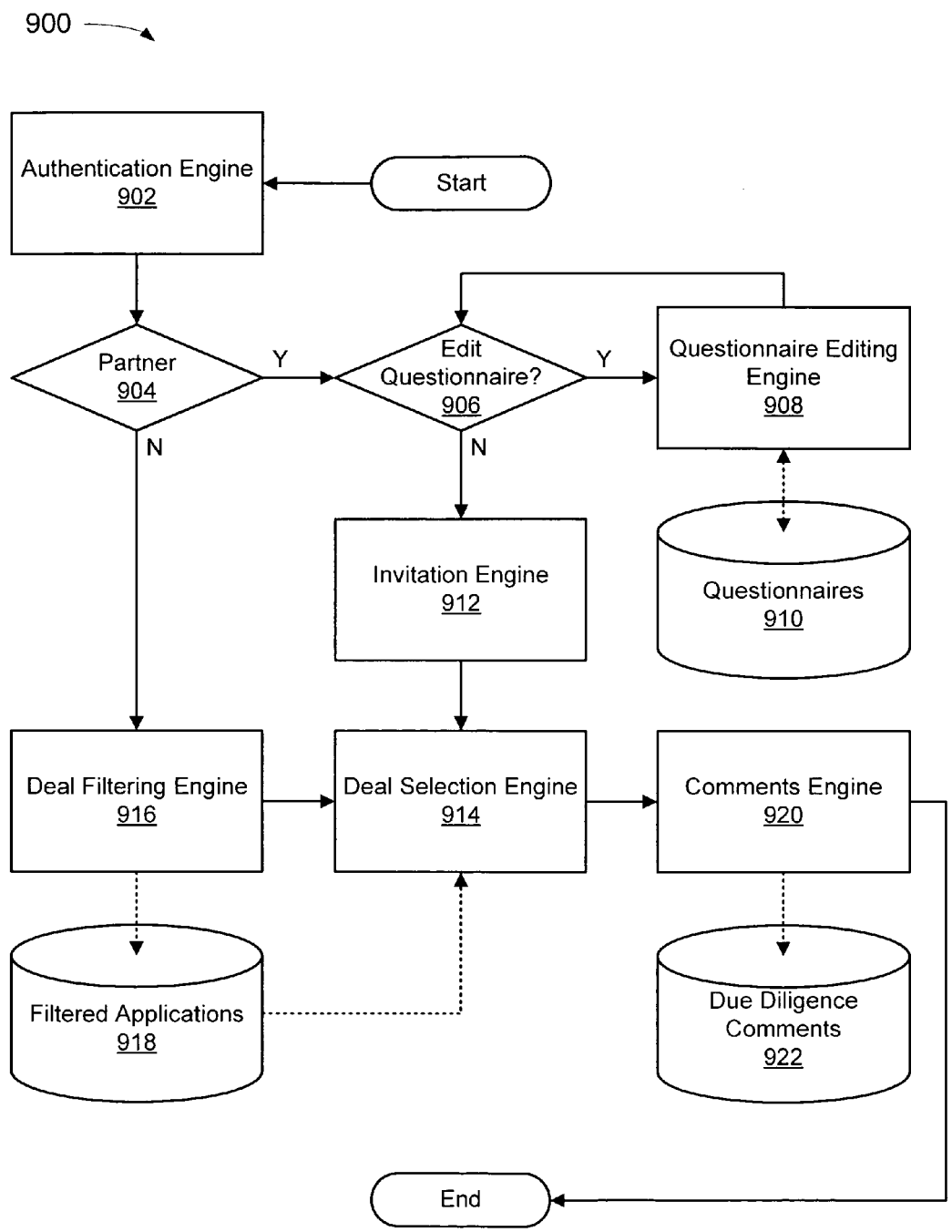
FIG. 9 depicts a flowchart of an example of an abbreviated due diligence method.

FIG. 9 depicts a flowchart 900 of an example of an abbreviated due diligence method, such as could be implemented by an abbreviated due diligence engine (see, e.g., FIG. 6). Advantageously, due diligence can be abbreviated when using the techniques described in this paper because, for example, venture scholars are already vetted by a university in accordance with their admissions policy.

In the example of FIG. 9, the flowchart 900 starts at authentication engine 902. The authentication engine 902 is responsible for largely configuration-related procedures that ensure only partners and appropriately qualified invitees can select deals from a group of student venture applications. Certain procedures, such as creating, editing, or removing questionnaires may only be applicable to partners; so the authentication engine 902 may authenticate invitees for only a subset of the engines described in the example of FIG. 9. The authentication engine 902 can, for example, register, authenticate, verify username/password, etc.

In the example of FIG. 9, the flowchart 900 continues to decision point 904 where it is determined whether an authenticated party is a partner. If it is determined that the authenticated party is a partner (904-Y), then the flowchart 900 continues to decision point 906 where it is determined whether the partner wishes to create, edit, or delete a questionnaire. If it is determined that the partner wishes to create, edit, or delete a questionnaire (906-Y), then the flowchart 900 continues to a questionnaire editing engine 908. The questionnaire editing engine 908 facilitates creation of a questionnaire, including giving a name to the questionnaire, adding a question, setting question attributes, such as whether the question is required or optional, has associated attachments (such as data that is useful for review when answering the question), text constraints, and weighting the question for the purpose of setting scores in, for example, a collaborative student venture ranking engine (see, e.g., FIG. 8). The questionnaire can be added to a questionnaires database 910. The questionnaire editing engine 908 also facilitates editing a questionnaire, including adding, editing, or removing questions, changing question attributes. The questionnaire engine 908 also facilitates removing a questionnaire from the questionnaires database 910.

In the example of FIG. 9, after the a questionnaire is added, edited, or removed, the flowchart 900 returns to decision point 906, where it is repeatedly determined whether the partner wishes to create, edit, or delete a questionnaire until it is determined that the partner does not wish to create, edit, or delete a questionnaire (906-N), at which point the flowchart 900 continues to invitation engine 912. The invitation engine 912 facilitates the invitation of entrepreneurs, references for team members, or other parties by partners. It may be noted that in some embodiments, parties could be invited by other parties (not shown). For example, a first entrepreneur could invite a second entrepreneur. For the purposes of this example, the partner may invite zero or more parties at the invitation engine 912. Since it is possible to invite zero parties when carrying out the method, the invitation engine 912 is indicated to be optional. However, it should be noted that the system is most useful if parties other than partners have access to certain aspects of the system. So some type of invitation (whether explicit or implicit, or push-type or pull-type) would be desirable.

In the example of FIG. 9, the flowchart 900 continues to the deal selection engine 914, which is described shortly. Returning once again to decision point 904, if it is determined that the authenticated party is not a partner (904-N), then the flowchart 900 continues to deal filtering engine 916. The deal filtering engine 916 filters student venture applications to which, for example, a non-partner invitee has access. The results of the deal filtering engine 916 may also reduce access to certain engines in the system, the specifics which may vary depending upon the implementation, configuration, embodiment, or "level" of authentication for a given party.

In the example of FIG. 9, the flowchart 900 continues to the deal selection engine 914. The deal selection engine 914 facilitates selection of a deal from a filtered applications database 918. The deal filtering engine 916, when applicable, can limit the deals that can be selected in this way, as described previously. Querying the filtered applications database 918 can be accomplished through a known or convenient system, such as a server and a client. The party conducting the query may receive a list of deals in, for example, a deal list dashboard (not shown), from which a specific deal can be selected, or, depending upon implementation, configuration, authorization, and/or embodiment, a suite of deals can be considered at once.

In the example of FIG. 9, the flowchart 900 continues to comments engine 920. The comments engine facilitates the reading and writing of comments in association with student venture applications, questionnaires, or other parts of the system. The reading or writing of comments may be restricted based upon whether a party is a partner or non-partner (and by that amount of access permitted for a non-partner, if applicable). Different users may have different authorizations to read comments, even for student venture applications that they can access, and may have different "places" in the applications where comments can be written. For example, some users may be able to add general comments about a deal, comments about questionnaire-submitted answers, comments to submitted documents, comments to collaborative ranking scores, comments to other comments, or any other applicable comment. Comments can be stored in a due diligence comments database 922, as is depicted in the example of FIG. 9 by the dashed arrow from the comments engine 920 to the due diligence comments database 922. The entries of the due diligence comments database 922 can be a distinct database (whether a traditional database or not), comments can be stored in association with the relevant item (e.g., student venture application, questionnaire, etc.), or all relevant due diligence data can be thought of as a comprehensive due diligence database (not shown) useful when selecting student ventures in which to invest.

Figure 10:
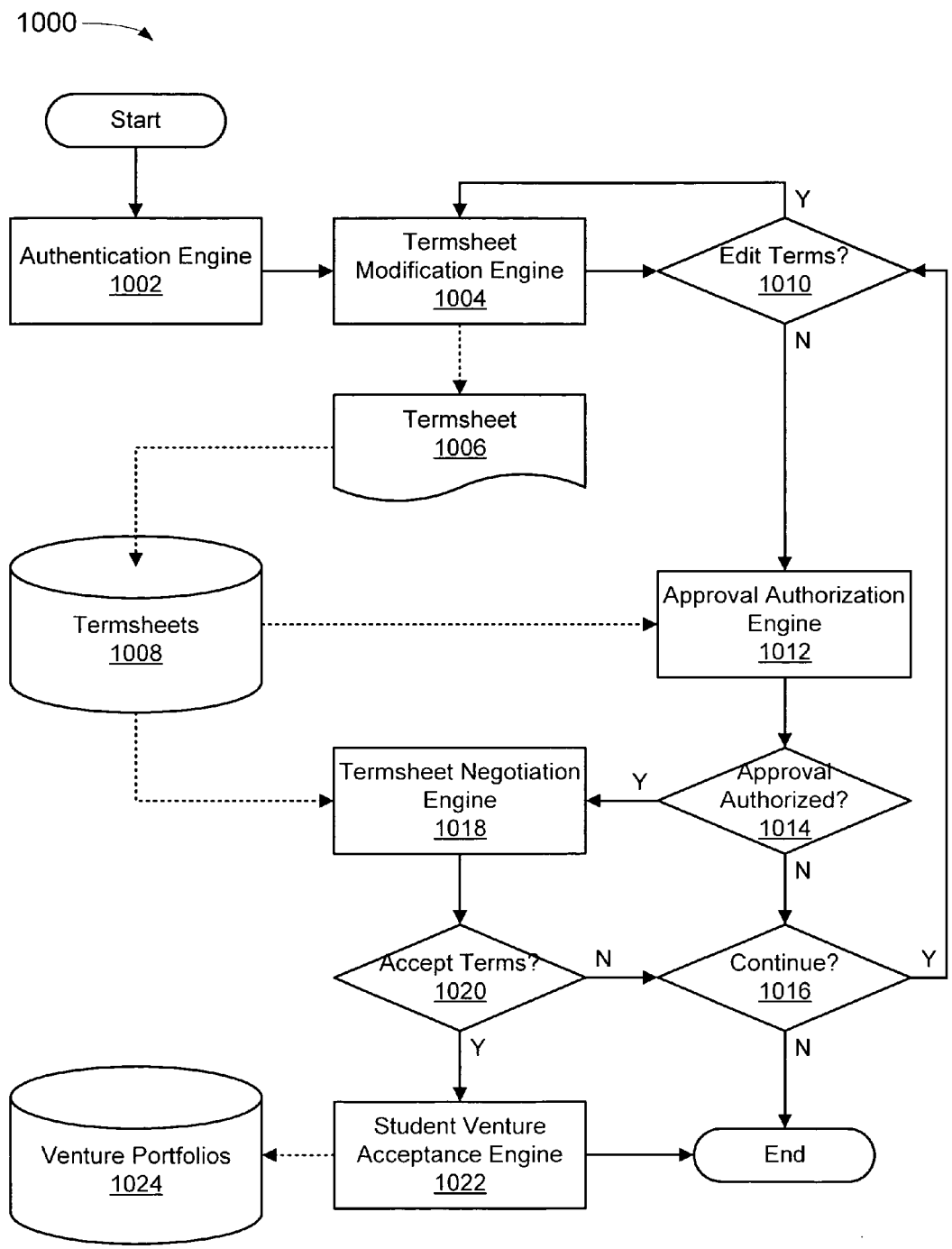
FIG. 10 depicts a flowchart of an example of a student venture termsheet management method.

FIG. 10 depicts a flowchart 1000 of an example of a student venture termsheet management method, such as could be implemented by a student venture termsheet management engine (see, e.g., FIG. 6). In the example of FIG. 10, the flowchart 1000 starts at authentication engine 1002. The authentication engine 1002 is responsible for largely configuration-related procedures that ensure only partners and appropriately qualified student venture teams, entrepreneurs, lawyers, etc. can facilitate in the generation of a termsheet associated with a student venture. Certain procedures, such as creating, editing, or removing termsheet templates may only be applicable to partners; so the authentication engine 1002 may authenticate other users for only a subset of the engines described in the example of FIG. 10. The authentication engine 1002 can, for example, register, authenticate, verify username/password, etc.

In the example of FIG. 10, the flowchart 1000 continues to a termsheet modification engine 1004. The termsheet modification engine 1004 is described in more detail in the example of FIG. 11. The termsheet modification engine 1004 facilitates the creation of a termsheet 1006, which can be started from scratch—or from a template from a templates database (not shown)—and built using terms from a terms database (not shown) and rules from a rules database (not shown), and which is stored in a termsheets database 1008.

In the example of FIG. 10, the flowchart 1000 continues to decision point 1010 where it is determined whether to edit terms. If it is determined that terms are to be edited (1010-Y), then the flowchart 1000 continues to the termsheet modification engine 1004, as described previously. If, on the other hand, it is determined that the terms are not to be edited, then the flowchart 1000 continues to approval authorization engine 1012. The approval authorization engine 1012 can submit a termsheet or relevant data to a partner for comments and/or authorization for approval. The approval authorization engine 1012 can also submit the termsheet to a lawyer for comments and/or authorization for approval. If approval is authorized by the partner (and other partners, if applicable) and the lawyer (and other lawyers, if applicable), then the termsheet can be signed by a student venture team and an entrepreneur, if they can agree to the terms of the termsheet.

In the example of FIG. 10, the flowchart 1000 continues to decision point 1014 where it is determined whether approval is authorized. If approval is not authorized (1014-N), then the flowchart 1000 continues to decision point 1016 where it is determined whether to continue. If it is determined not to continue (1016-N), then the flowchart 1000 ends with a failure to create a timesheet that is acceptable. If, on the other hand, it is determined to continue (1016-Y), then the flowchart 1000 returns to decision point 1010 and continues as described previously. Presumably, if approval was not authorized (1014-N), but it is determined that the process should continue (1016-Y), then it will be determined that the terms need to be edited (1010-Y). However, it is possible that approval is not authorized due to factors outside of the scope of the flowchart 1000; when those factors change, approval may be authorized.

Returning once again to decision point 1014, if it is determined that approval is authorized (1014-Y), then the flowchart 1000 continues to a termsheet negotiation engine 1018. The termsheet negotiation engine 1018 facilitates negotiations between an entrepreneur interested in a student venture and the student venture team associated with the student venture. Either party may be assisted by other parties, of course.

In the example of FIG. 10, the flowchart 1000 continues to decision point 1020 where it is determined whether the parties accept the terms of the termsheet. If it is determined that the parties do not accept the terms of the termsheet (1020-N), then the flowchart 1000 returns to decision point 1016 and continues as described previously. A decision to continue may mean that the parties are interested in continuing the negotiations, while a decision not to continue may mean that negotiations have ended in failure. If, on the other hand, it is determined that the parties accept the terms of the termsheet (1020-Y), then the flowchart 1000 continues to a student venture acceptance engine 1022, where the termsheet is signed and student venture data is stored in a venture portfolios database 1024. At this point, the flowchart 1000 ends.

Figure 11:
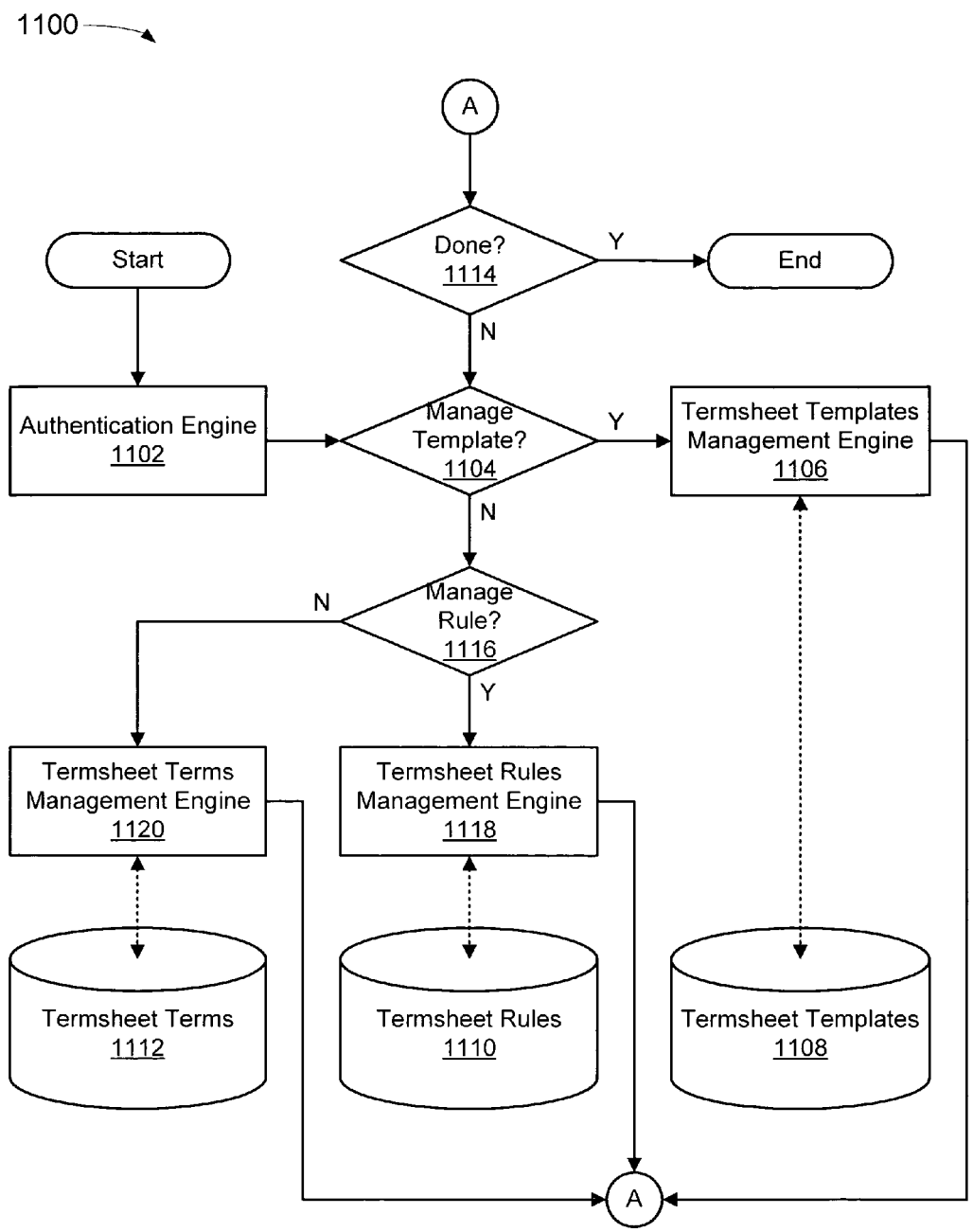
FIG. 11 depicts a flowchart of an example of a termsheet modification method.

FIG. 11 depicts a flowchart 1100 of an example of a termsheet modification method, such as could be implemented by a termsheet modification engine (see, e.g., FIG. 10). In the example of FIG. 11, the flowchart 1100 starts at authentication engine 1102. The authentication engine 1102 is responsible for largely configuration-related procedures that ensure only partners and appropriately qualified entrepreneurs, VCs, lawyers, etc. can facilitate in the generation of a termsheet associated with a student venture. Certain procedures, such as creating, editing, or removing termsheet templates may only be applicable to, for example, partners and VCs; so the authentication engine 1102 may authenticate other users for only a subset of the engines described in the example of FIG. 11. The authentication engine 1102 can, for example, register, authenticate, verify username/password, etc.

In the example of FIG. 11, the flowchart 1100 continues to decision point 1104 where it is determined whether to manage a termsheet template. If it is determined to manage a termsheet template (1104-Y), then the flowchart 1100 continues to termsheet templates management engine 1106. The termsheet templates management engine 1106 facilitates the creation, editing, or deletion of termsheet templates, which are stored in a termsheet templates database 1108. The termsheet templates management engine 1106 may make use of terms and rules that are managed in a manner that is described later. The termsheets management engine 1106 may also make use of a collaborative rankings engine to obtain data that may affect various terms either automatically or provide information that facilitates intelligent manual termsheet template modification based on, for example, attribute rankings.

In the example of FIG. 11, the flowchart 1100 continues to decision point 1114 where it is determined whether the management process is done (presumably for a given session). If it is determined that the management process is done (1114-Y), then the flowchart 1100 ends. If, on the other hand, it is determined that the management process is not done (1114-N), then the flowchart 1100 returns to decision point 1104, and continues as described previously.

Returning once again to decision point 1104, if it is determined not to manage a termsheet template (1104-N), then the flowchart 1100 continues to decision point 1114 where it is determined whether to manage a termsheet rule. If it is determined to manage a termsheet rule (1114-Y), then the flowchart 1100 continues to a termsheet rules management engine 1118, then returns to decision point 1104 and continues as described previously. The termsheet rules management engine 1118 facilitates creating, editing, and deleting rules in the termsheet rules database 1110.

When creating a rule, an attribute or group of attributes is selected from any applicable place in the system for association with the rule. Examples of engines from which applicable attributes are likely to be found include a student venture application management engine, a collaborative student venture ranking engine, or a student venture due diligence engine (see, e.g., FIG. 6). A rule trigger, such as by way of example but not limitation, an if/then/else rule trigger, a numeric value range of attribute trigger, a top/bottom % rule trigger, an above/below rule trigger, a unique formula rule trigger, or some other applicable rule trigger, is selected for association with the rule. Optionally, the rule can be associated with a specific set of terms. Thus, the termsheet rules database 1110 and the termsheet terms database 1112 can have some overlap and/or redundancy. The rule is saved to the termsheet rules database 1110.

If, on the other hand, it is determined not to manage a termsheet rule (1116-N), then the flowchart 1100 continues to a termsheet terms management engine 1120, then returns to decision point 1114 and continues as described previously. The termsheet terms management engine 1120 facilitates adding, editing, and removing terms in the termsheet terms database 1112. When creating a term, the term is typically given a name and text (including optional variables) is associated with the term. Other possibilities include defining in association with the term inter-term dependencies triggered by rules, associating conditions (or rules) with a specific set of terms, and addition conditions (or rules) that cause the term to express itself in a termsheet. The term can be saved in the termsheet terms database 1112. When editing a term, any value associated with the term can likely be changed.

The termsheet templates database 1108, a termsheet rules database 1110, and a termsheet terms database 1112 may be referred to collectively as a termsheet master database (not shown). A termsheet modification engine (see, e.g., FIG. 10) can use the termsheet master database to create a termsheet for a student venture.

Figure 12:
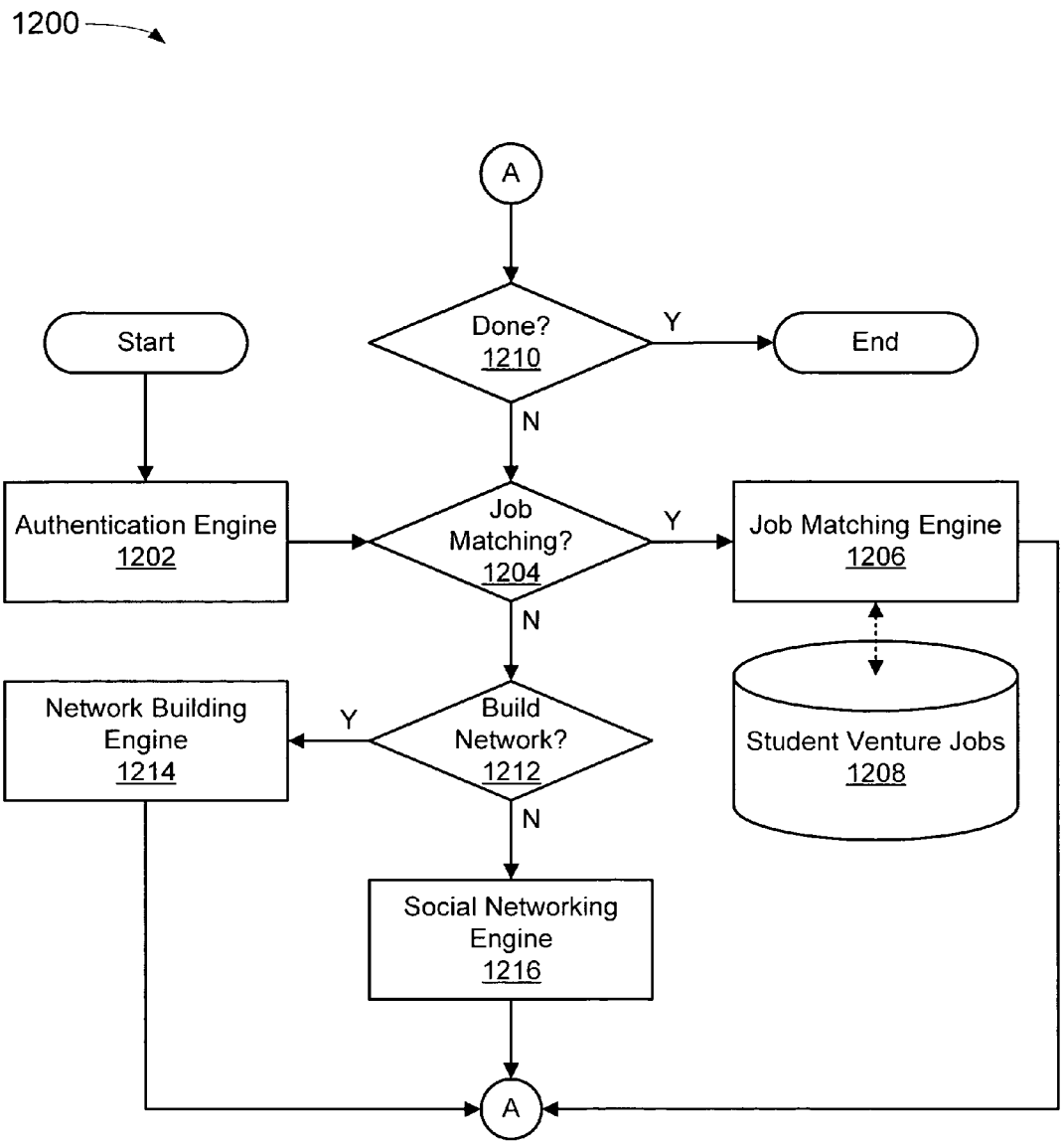
FIG. 12 depicts a flowchart of a venture scholar networking method.

FIG. 12 depicts a flowchart 1200 of a venture scholar networking method, such as could be implemented by a venture scholar networking engine (see, e.g., FIG. 5). In the example of FIG. 12, the flowchart 1200 starts with an authentication engine 1202. The authentication engine 1202 is responsible for largely configuration-related procedures that ensure only appropriately qualified users can have access to networking. Appropriate users may be those who wish to advertise student venture jobs, find student venture scholarships, seek help from peers, experts, and/or mentors, etc. Since at least part of the purpose of the networking engine is to provide knowledge to those who are curious, it may be desirable to make authentication relatively easy (e.g., allow new users to create "guest" accounts or the like). Certain procedures, such as posting student venture jobs, may only be applicable to more carefully vetted users. The authentication engine 1202 can, for example, register, authenticate, verify username/password, etc.

In the example of FIG. 12, the flowchart 1200 continues to decision point 1204 where it is determined whether a user is interested in job matching. If it is determined that the user is interested in job matching (1204-Y), then the flowchart 1200 continues to a job matching engine 1206. The job matching engine 1206 can facilitate posting a job to a student venture jobs database 1208 or querying the student venture jobs database 1208 for a job. In this way, jobs can be posted by users who need to find venture scholars to join a student venture, and jobs can be found by venture scholars who want to join those student ventures. This can be advantageous in team building, since a team may be lacking some critical aspect that could improve the odds of success in attracting the interest of investors and/or succeeding in the student venture.

In the example of FIG. 12, the flowchart 1200 continues to decision point 1210 where it is determined whether the user is done using the venture scholar network. If the user is done (1210-Y), then the flowchart 1200 ends. If, on the other hand, the user is not done (1210-N), then the flowchart 1200 returns to decision point 1204.

At decision point 1204, if it is determined that the user is not interested in job matching (1204-N), then the flowchart 1200 continues to decision point 1212 where it is determined whether the user is interested in building a personal network. If it is determined that the user is interested in building a personal network (1212-Y), then the flowchart 1200 continues to a network building engine 1214, then returns to decision point 1210 and continues as described previously. The network building engine 1214 can facilitate adding friends, peers, and/or mentors to a personal network. Depending upon the implementation and/or configuration, a user may be able to establish a presence (e.g., a web page) within a venture scholar network.

If it is determined that the user is not interested in building a personal network (1212-N), then the flowchart 1200 continues to a social networking engine 1216, then returns to decision point 1210 and continues as described previously. The social networking engine 1216 can facilitate posting questions, announcements, comments, or other posts on a venture scholar network, and searching, browsing, or otherwise accessing such posts. In this way, venture scholars or potential venture scholars can obtain peer help, interact with mentors, experts, and/or other individuals, or utilize software programs available on the network.

Figure 13:
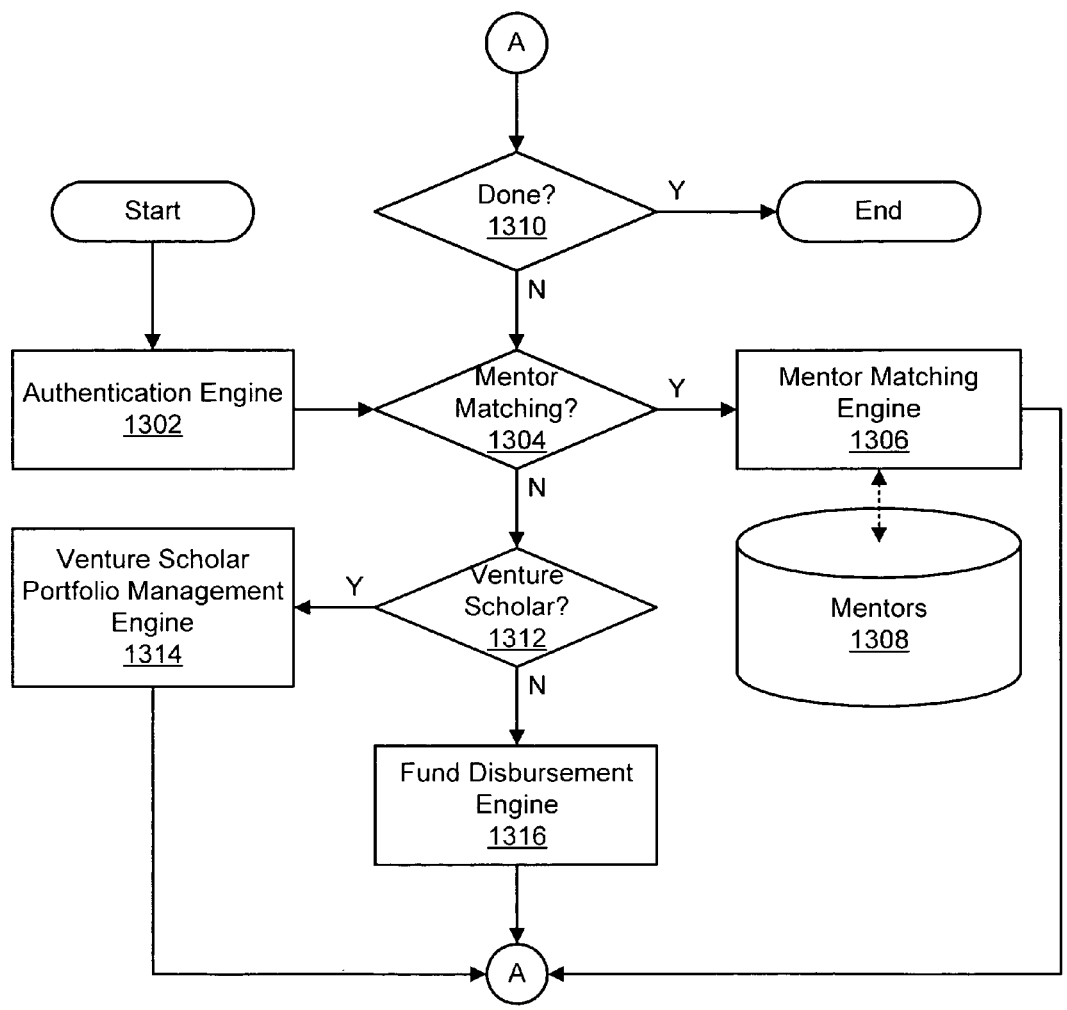
FIG. 13 depicts a flowchart of a venture scholar portfolio management method.

FIG. 13 depicts a flowchart 1300 of a venture scholar portfolio management method, such as could be implemented by a venture scholar portfolio management engine (see, e.g., FIG. 5). In the example of FIG. 13, the flowchart 1300 starts with an authentication engine 1302. The authentication engine 1302 is responsible for largely configuration-related procedures that ensure only appropriately qualified users can have access to networking. Appropriate users may be those who wish to find mentors for student ventures or monitor milestones, performance, and/or fund disbursements associate with student ventures. The authentication engine 1302 can, for example, register, authenticate, verify username/password, etc.

In the example of FIG. 13, the flowchart 1300 continues to decision point 1304 where it is determined whether a user is interested in mentor matching. If it is determined that the user is interested in mentor matching (1304-Y), then the flowchart 1300 continues to a mentor matching engine 1306. The mentor matching engine 1306 can facilitate posting a bio to a mentors database 1308 or querying the mentors database 1308 to find a mentor. In this way, bios can be posted by users or for individuals who wish to act as mentors, and a mentor can be found by venture scholars who want one of the mentors associated with a bio in the mentors database 1308. This can be advantageous in augmenting a team that has a weakness ameliorated by the skills of a particular mentor.

In the example of FIG. 13, the flowchart 1300 continues to decision point 1310 where it is determined whether the user is done managing the venture scholar portfolio. If the user is done (1310-Y), then the flowchart 1300 ends. If, on the other hand, the user is not done (1310-N), then the flowchart 1300 returns to decision point 1304.

At decision point 1304, if it is determined that the user is not interested in mentor matching (1304-N), then the flowchart 1300 continues to decision point 1312 where it is determined whether the user is a venture scholar. If it is determined that the user is a venture scholar (1312-Y), then the flowchart 1300 continues to a venture scholar portfolio management engine 1314, then returns to decision point 1310 and continues as described previously. The venture scholar portfolio management engine 1314 can facilitate receipt of alerts or messages associated with a student venture, updating contact information or other venture scholar information, reviewing milestones, performance, funding, etc. that is available to venture scholars. The amount of data that is provided to venture scholars can vary depending upon implementation or configuration.

If it is determined that the user is not a venture scholar (1312-N), then the flowchart 1300 continues to a fund disbursement engine 1316, then returns to decision point 1310 and continues as described previously. The fund disbursement engine 1316 can facilitate receipt of data, such as investment info. The investment info can be provided per venture scholar or for the team, or per year, phase, milestone, etc. The fund disbursement engine 1316 can also automatically trigger payment when milestones are met (though a maximum term or other limitation can preempt a trigger), or prompt a partner to consider fund disbursements for meeting a milestone. The fund disbursement engine 1316 can also exit a fund or prompt relevant parties to re-evaluate the deal when a maximum term is reached or when milestones are not met. The venture scholar portfolio management engine 1314 may or may not have access to this type of data for venture scholars. A fund resource management engine may be useful when used in conjunction with (before, during, or after) fund disbursements.

Figure 14:
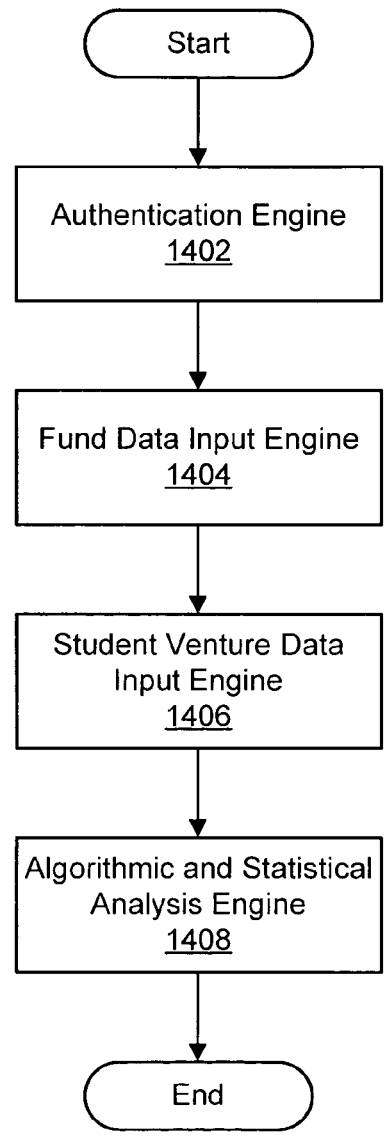
FIG. 14 depicts a flowchart of a student venture fund operations method.

FIG. 14 depicts a flowchart 1400 of a student venture fund operations method, such as could be implemented by a student venture fund operations engine (see, e.g., FIG. 5). In the example of FIG. 14, the flowchart 1400 starts with an authentication engine 1402. The authentication engine 1402 is responsible for largely configuration-related procedures that ensure only appropriately qualified users can have access to fund operations. Appropriate users may be, for example, partners or advisors. The authentication engine 1402 can, for example, register, authenticate, verify username/password, etc.

In the example of FIG. 14, the flowchart 1400 continues to fund data input engine 1404. The fund data input engine 1404 facilitates entry of data for a fund dedicated to student ventures. Such data can include, for example, fund size, fund fees, G&A expenses actuals, space/lab capacity, etc.

In the example of FIG. 14, the flowchart 1400 continues to student venture data input engine 1406. The student venture data input engine 1406 facilitates entry of data for one or more specific student ventures. Such data can include, for example, team data (e.g., number of members on the team, tuition fee and stipends per member, multiple of seed to invest for follow on, etc.), length of the program, or other student venture-specific data.

In the example of FIG. 14, the flowchart 1400 continues to algorithmic and statistical analysis engine 1408. The algorithmic and statistical analysis engine 1408 facilitates calculation of, for example, seed investment per person and/or per team, total fellowship cost, success rate, cumulative students/teams active in fund, analysis for additional investments by capital layout and capacity to be used if additional capacity exists or becomes available. If additional capacity exists or becomes available, then an investment decision also exists, and it may be desirable to utilize a student venture investment decision engine (see, e.g., FIG. 5) to select an appropriate investment vehicle.

Other fund or LP management utilities can include various reports and displays (e.g., dashboards), the ability to call for and place capital, alerts, IRR auto calculators on returns, direct investment vehicles for double-dipping, etc. University endowment LPs might be given access to additional utilities, such as university real-time ecosystem calculators (receiving input from, for example, venture scholarship statistics monitors, student jobs created statistics, scholarship expense offsets, venture scholar alumni giving trackers, etc.), classroom reporting engines (e.g., grades determine eligibility and teachers can communicate with LPs), cash and scholarship commitment managers, eligibility alerts, etc. Partners might be given access to utilities that can include generating reports specific to a fund or across funds, modifying dashboard access for an LP, making capital calls, reporting liquidity events, returning capital in appropriate proportion according to investment agreements, soliciting fund placement for new funds, double dipping management (e.g., as investments mature and approach liquidity events select LPs can be allowed to deploy capital directly into a successful venture to maximize upside).

Other utilities might include document managers capable of storing various documents in associations with the various engines and databases used to implement the techniques described in this paper. This can include third party resource managers.

Other utilities might include CRM (VC/LP/CxO) or affiliate managers. This can include contact database management, synchronization and import engines for contacts and correspondence or files, affiliate rules (e.g., auto renewal, license term length, click to request payment, royalty fee calculators, etc.), and the like.

A computing system representative of computing systems described in this paper can include a processor, a communications interface, memory, a display controller, non-volatile storage, and an I/O controller. A computing system can be coupled to or include I/O devices, including display devices. The device interfaces to external systems through the communications interface. A typical computer system will usually include at least a processor, memory, and a bus coupling the memory to the processor. One of skill in the art will immediately recognize that the terms "machine-readable medium" or "computer-readable medium" includes any type of storage device that is accessible by a processor.

A computer system is often controlled by operating system software which includes a file management system, such as a disk operating system, which is part of the operating system software. The file management system is typically stored in non-volatile storage and causes the processor to execute the various acts required by the operating system to input and output data and to store data in memory, including storing files on the non-volatile storage.

Some portions of the detailed description are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is Appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The present example also relates to apparatus for performing the operations herein. This apparatus may be specially constructed for the required purposes, or it may comprise a general purpose computer selectively activated or reconfigured by a computer program stored in the computer. Such a computer program may be stored in a computer readable storage medium, such as, but is not limited to, read-only memories (ROMs), random access memories (RAMs), EPROMs, EEPROMs, flash memory, magnetic or optical cards, any type of disk including floppy disks, optical disks, CD-ROMs, and magnetic-optical disks, or any type of media suitable for storing electronic instructions, and each coupled to a computer system bus.

The algorithms and displays presented herein are not inherently related to any particular computer or other apparatus. Various general purpose systems may be used with programs in accordance with the teachings herein, or it may prove convenient to construct more specialized apparatus to perform the required method steps. The required structure for a variety of these systems will appear from the description below. In addition, the present example is not described with reference to any particular programming language, and various examples may thus be implemented using a variety of programming languages.

What is claimed is:

1. A system comprising:
an authentication engine;
a student venture investment decision engine;
a filtered student venture applications data store;
a server and backend controller coupled to the authentication engine, the student venture investment decision engine, and the filtered student venture applications data store;
wherein, in operation:
the authentication engine authenticates an investor via the server and backend controller;
the student venture investment decision engine receives from the investor a message sufficient to identify a student venture having an associated data structure stored in the filtered student venture applications data store in which to invest.

2. The system of claim 1, further comprising a venture scholar networking engine including a job matching engine for posting a job to a student venture jobs data store or querying the student venture jobs data store.

3. The system of claim 1, further comprising a venture scholar portfolio management engine including a mentor matching engine for posting a bio to a mentors database and querying the mentors database to find a mentor.

4. The system of claim 1, further comprising a student venture fund operations engine including a fund data input engine for receiving data for a fund dedicated to student ventures.

5. The system of claim 1, further comprising:
a questionnaire editing engine, coupled to the server and backend controller, for enabling the user to edit a questionnaire;
an invitation engine, coupled to the server and backend controller, for inviting other users to participate in scoring student venture investment opportunities;
a deal filtering engine, coupled to the server and backend controller, for filtering student ventures at least in part in accordance with the questionnaire;
a deal selection engine, coupled to the server and backend controller, for selecting the student venture, wherein the student venture is one of the filtered student ventures;
a comments engine, coupled to the server and backend controller, for receiving comments from the user regarding the student venture.

6. The system of claim 1, further comprising a venture scholar networking engine including a network building engine for adding friends or mentors to a personal network.

7. The system of claim 1, further comprising a venture scholar networking engine including a social networking engine for posting on a venture scholar network and for finding other posts on the venture scholar network.

8. The system of claim 1, further comprising a venture scholar portfolio management engine including a funds disbursement engine for triggering payment when milestones of the student venture are met.

9. The system of claim 1, further comprising a venture scholar portfolio management engine including a funds disbursement engine for prompting a partner to consider fund disbursements for meeting a milestone of the student venture when the milestone is met.

10. The system of claim 1, further comprising a student venture fund operations engine including a student venture data input engine for receiving data for the student venture.

11. The system of claim 1, further comprising a student venture fund operations engine including an algorithmic and statistical analysis engine for calculating whether additional capacity exists, wherein if additional capacity exists an investment decision also exists.

\* \* \* \* \*